(12) United States Patent
Boesen et al.

(10) Patent No.: US 6,754,358 B1
(45) Date of Patent: Jun. 22, 2004

(54) METHOD AND APPARATUS FOR BONE SENSING

(76) Inventors: Peter V. Boesen, 1000 73$^{rd}$ St., Suite 18, Des Moines, IA (US) 50311; John A. Roberts, 56284 Hwy. 210, Huxley, IA (US) 50124; David S. Whitty, 1009 NE Grant St., Apt. 204, Ankeny, IA (US) 50021

( * ) Notice: Subject to any disclaimer, the term of this patent is extended or adjusted under 35 U.S.C. 154(b) by 0 days.

(21) Appl. No.: 09/902,153

(22) Filed: Jul. 10, 2001

Related U.S. Application Data

(63) Continuation-in-part of application No. 09/587,743, filed on Jun. 5, 2000, which is a continuation of application No. 09/309,107, filed on May 10, 1999, now Pat. No. 6,094,492.

(51) Int. Cl.$^7$ ................................................. H04R 25/20
(52) U.S. Cl. ........................ 381/326; 381/328; 381/151; 381/312; 381/380; 381/324; 381/173
(58) Field of Search ................................ 600/528, 529, 600/536; 607/27, 62; 381/313, 312, 322, 324, 326, 328, 114, 151, 329, 162, 380, 361, 173; 340/853.2, 426.24, 463, 539.22, 539.23, 545.2, 391.1

(56) References Cited

U.S. PATENT DOCUMENTS

| | | |
|---|---|---|
| 4,150,262 A | 4/1979 | Ono |
| 4,334,315 A | 6/1982 | Ono et al. |
| 4,588,867 A | 5/1986 | Konomi |

(List continued on next page.)

FOREIGN PATENT DOCUMENTS

| | | |
|---|---|---|
| EP | 0 683 621 A | 11/1995 |
| GB | 2 074 817 | 11/1981 |
| JP | 2000022670 A | 1/2000 |

OTHER PUBLICATIONS

Article entitled "One–Size Disposable Hearing Aid is Introduced," Wayne J. Staab, Walter Sjursen, David Preves & Tom Squeglia, p. 36–41, Apr. 2000.
Article entitled "The Hearing Review", Jan. 1999, vol. 3, Hearing in Noise (Supplement), pp. 1–62.
Article entitled, "5th International Conference on Wearable Computers," by Rick Johnson, Pen Computing Magazine, Aug. 2000.
Air Magic Wireless Headset User Guide.
Article entitled, "Agilent Technologies Announces Availability of Wireless Network Cap for Portable Patient Monitor," http://www.healthcare.agilent.com/press–re;ease/PRHS2920030.html.
Article entitled, "Agilent Technologies Introduces New Telemon Patient Monitor," http:/www.healthcare.agilent.com/press–release/PRHS2920016.html.

(List continued on next page.)

*Primary Examiner*—Curtis Kuntz
*Assistant Examiner*—Dionne Harvey
(74) *Attorney, Agent, or Firm*—McKee, Voorhees & Sease, P.L.C.

(57) ABSTRACT

The invention discloses an improved bone conduction sensor capable of use within a voice sound transmitting apparatus. The bone conduction sensor is adapted for placement in the external auditory canal of the user in a nonocclusive fashion. The bone conduction sensor has a contoured surface adapted-to fit against a wall of the external auditory canal increasing the surface area contact between the bone conduction sensor and the wall of the external auditory canal. The bone conduction sensor may also be associated with one or more contact sensors adjacent the bone conduction sensor for determining contact between the bone conduction sensor and the wall of the external auditory canal. In addition, the invention provides for the bone sensing element to be separated from the circuit portion of the bone conduction sensor so that the circuitry may be removed to the behind the ear portion of the earpiece.

12 Claims, 6 Drawing Sheets

U.S. PATENT DOCUMENTS

| | | | |
|---|---|---|---|
| 4,654,883 A | | 3/1987 | Iwata |
| 4,791,673 A | | 12/1988 | Schreiber |
| 5,033,090 A | * | 7/1991 | Weinrich |
| 5,191,602 A | | 3/1993 | Regen et al. |
| 5,201,007 A | | 4/1993 | Ward et al. |
| 5,280,524 A | | 1/1994 | Norris |
| 5,295,193 A | * | 3/1994 | Ono |
| 5,298,692 A | | 3/1994 | Ikeda et al. |
| 5,381,798 A | | 1/1995 | Burrows |
| 5,417,222 A | | 5/1995 | Dempsey et al. |
| 5,422,934 A | | 6/1995 | Massa |
| 5,458,123 A | | 10/1995 | Unger |
| 5,613,222 A | | 3/1997 | Guenther |
| 5,692,059 A | * | 11/1997 | Kruger |
| 5,721,783 A | | 2/1998 | Anderson |
| 5,771,438 A | | 6/1998 | Palermo et al. |
| 5,803,915 A | * | 9/1998 | Kremenchugsky |
| 5,933,506 A | | 8/1999 | Aoki et al. |
| 5,959,896 A | * | 9/1999 | Forbes |
| 5,987,146 A | | 11/1999 | Pluvingage et al. |
| 6,021,207 A | | 2/2000 | Puthuff et al. |
| 6,094,492 A | * | 7/2000 | Boesen |
| 6,112,103 A | | 8/2000 | Puthuff |
| 6,181,801 B1 | | 1/2001 | Puthuff et al. |

OTHER PUBLICATIONS

Article entitled, "Brain cancer victim sues cell–phone providers," http://www.cnn.com/2000/TECH/computing/08/08/cellular.cancer.lawsuit.idg/index.html, Aug. 8, 2000.

Article entitled, "M3 and M4 Series Patient Monitors," http://www.healthcare.agilent/com/show_product.pl?M3%20and20M4%20Series%20Patient%20monitor.

Article entitled, "Report Urges Curbs on Mobile Phone Use," http://www.tyechweb.com/wire/story/TWB2000515S005: May 15, 2000.

Article entitled, "Scientist link eye cancer to mobile phones," by Jonathan Leakes: Jan. 14, 2001: http://www.Sunday–time.co.uk/news/pages/sti/2001/01/14/stinwensw01032.html.

Article entitled, "The latest on cell phone emissions".

Article entitled "U.S. Will Oversee Cell–Phone Safety Studies," http://www.techweb.com/wire/story/reuters/REU20000609S0003 Jun. 9, 2000.

Article entitled "What is a Wireless LAN?," 1998, Proxim, Inc.

Article entitled, "Wireless Worries Are Cell Phones a Danger to You and Your Children," http://more.abcnews.go.com/onair/2020/2020_00526_cellphones.html May 26, 2000.

Bluetooth Usage Model, http://www.bluetooth.com/bluetoothguide/models/ultimate.asp (visited Jun. 26, 2000).

* cited by examiner

METHOD AND APPARATUS FOR BONE SENSING

CROSS-REFERENCE TO RELATED APPLICATIONS

This application is a continuation-in-part to U. S. patent application Ser. No. 09/587,743 filed Jun. 5, 2000, which is a continuation of U. S. patent application Ser. No. 09/309,107 filed May 10, 1999 and issued as U. S. Pat. No. 6,094,492 on Jul. 25, 2000.

BACKGROUND OF THE INVENTION

1. Field Of The Invention

The present invention is a method and apparatus for bone sensing in a voice sound transmitting apparatus and system.

2. Problems In The Art

The present invention relates to improvements in bone conduction sensing particularly as they relate to use in a voice sound transmitting apparatus. A voice sound transmitting apparatus is disclosed in U. S. Pat. No. 6,094,492 to Dr. Peter V. Boesen, M.D. herein incorporated by reference in its entirety. To improve upon the voice quality, both a bone conduction sensor and an air conduction sensor are used. Processing can occur on the bone conduction sensor sensed signal and the air conduction sensor sensed signal in order to better determine the voice sound information and in order to block out ambient noise or other extraneous information that might be undesirable. The voice sound transmitting apparatus of Boesen places the bone conduction sensor within the external auditory canal of a user in a manner that is nonocclusive.

Despite these advancements and advantages, problems remain.

In particular, prior art bone conduction sensors have a number of characteristics and limitations that limit their performance in the context of a voice sound transmitting apparatus. First, it should be apparent that a number of bone conduction sensors are dimensioned in a manner that precludes their use in a bone conduction sensing apparatus that fits within the external auditory canal of a user. This is particularly true where the placement of the bone conduction sensor in an external auditory canal is nonocclusive. Where nonocclusivity is sought, reduced dimensions are preferred.

A further problem with prior art bone conduction sensors is the shape of the sensor. The Applicants have found that in order to improve bone conduction sensing the bone conduction sensor should be shaped in a manner that improves the fit of the bone conduction sensor to the wall of the external auditory canal in order to increase the surface area of the bone conduction sensor that contacts the wall of the external auditory canal. Therefore, there are problems with the shape of current bone conduction sensors.

A further problem identified by the Applicants is the tendency of an earpiece containing a bone conduction sensor positioned in the external auditory canal to be displaced or dislodged over time. This degrades the quality of sound received from the voice sound transmitting apparatus.

Thus, there are a number of needs not currently being addressed related to bone conduction sensing in a voice sound transmitting apparatus.

Therefore, it is a primary object, feature, or advantage of the present invention to provide an apparatus and method which improves upon the state of the art.

It is another object, feature, or advantage of the present invention to provide an apparatus and method for bone conduction sensing.

It is a further object, feature, or advantage of the present invention to provide an apparatus and method for bone conduction sensing suitable for use in the external auditory canal.

It is a further object, feature, or advantage of the present invention to provide an apparatus and method for bone conduction sensing within the external auditory canal that is nonocclusive.

As a further object, feature, or advantage of the present invention to provide an apparatus and method for bone conduction sensing that is capable of detecting when the bone conduction sensor has been displaced.

Yet a further object, feature, or advantage of the present invention is to provide an apparatus and method for bone conduction sensing that provides for increased surface area contact.

A still further object, feature, or advantage of the present invention is to provide an apparatus and method for bone conduction sensing that is small in size.

Another object, feature, or advantage of the present invention is to provide an apparatus and method for bone conduction sensing that provides for improved sensor placement within an ear.

A further object, feature, or advantage of the present invention is to provide an improved apparatus and method for bone conduction sensing suitable for use in a voice sound transmitting apparatus.

A still further object, feature, or advantage of the present invention is an improved voice sound apparatus capable of compensating for a displaced bone conduction sensor.

These and other objects, features, or advantages of the present invention will become apparent from the specification and claims.

BRIEF SUMMARY OF THE INVENTION

The present invention is an apparatus and method for improved bone conduction sensing. The present invention includes an improved bone conduction sensor that is sized and shaped to nonocclusively fit within the external auditory canal of a user. The bone conduction sensor is further shaped to increase the surface area contact between the external auditory canal wall and the bone conduction sensor. A circuit portion of the bone conduction sensor is positioned at a location remote from the bone conduction sensing element in order to reduce the size of the portion of the bone conduction sensor placed within the external auditory canal. The bone conduction sensor also includes one or more contact sensors adjacent to the bone conduction sensor used to determine whether the bone conduction sensor is in contact with the external auditory canal of the user. Further, the present invention provides for a separation layer that may be attached between the bone conduction sensor and the external auditory canal in order to improve the sensing performance and to protect the wall of the external auditory canal.

The present invention includes an improved voice sound transmitting apparatus that uses the bone conduction sensor of the present invention. The bone conduction sensor is combined with an air conduction sensor placed within the external auditory canal of the user. Additionally, the earpiece can include a speaker, a processor, and a transmitter. When the bone conduction sensor becomes displaced the one or more contact sensors can be used to communicate to the processor that the bone conduction sensor is displaced and the processor can then change the processing algorithm accordingly.

BRIEF DESCRIPTION OF THE DRAWINGS

The present invention is illustrated by way of example and not limitation in the figures of the accompanying drawings, and references indicate similar elements and in which.

DETAILED DESCRIPTION OF THE INVENTION

The present invention will now be described as it applies to an exemplary embodiment. It is not intended that the present invention be limited to the described embodiment. It is intended that the invention cover all modifications and alternatives which may be included within the spirit and scope of the invention.

The present invention is an apparatus and method for improved bone conduction sensing. In particular, for improved bone conduction sensing sized and shaped to nonocclusively fit within an external auditory canal of the user and for use with voice sound sensing.

Figure 1:
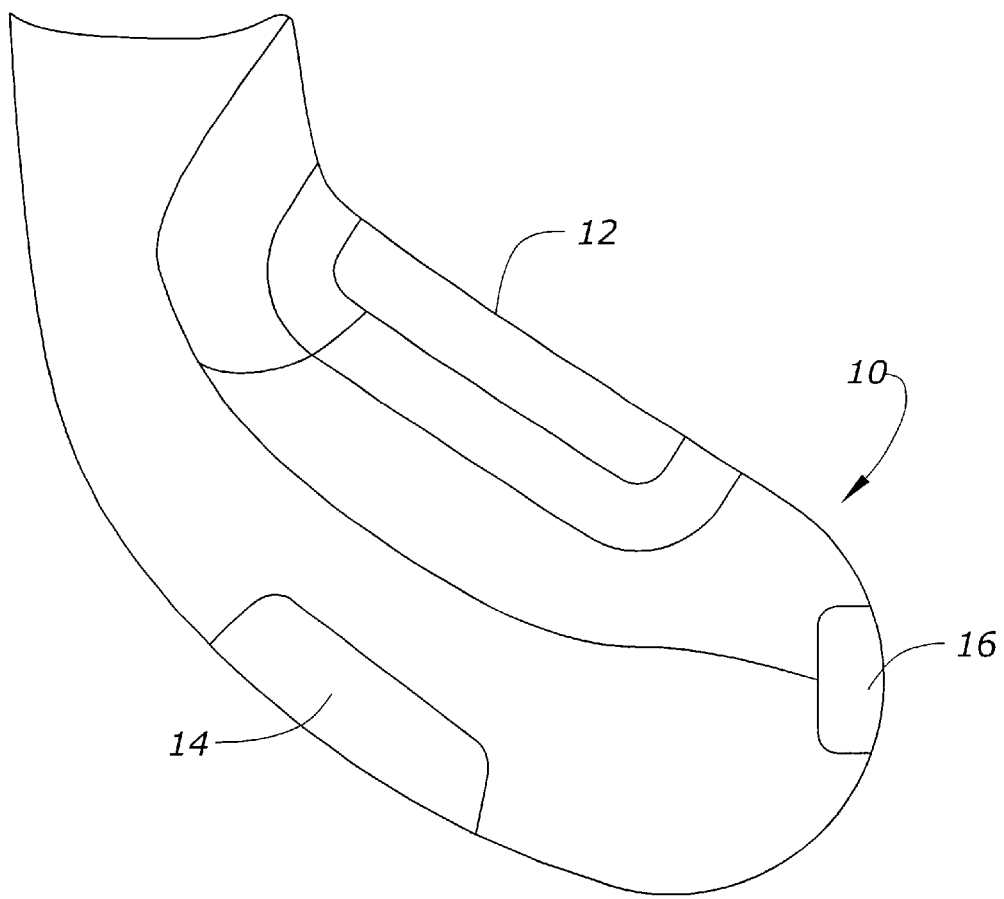
FIG. 1 is a diagram of a voice sound transmitting apparatus of the present invention.

FIG. 1 is a diagram of a voice sound transmitting device 10 of the present invention. The device includes an improved bone conduction sensor 12. In addition, the device includes an air conduction microphone 14 and a speaker 16 all within device 10 which is adapted to be nonocclusively positioned within the external auditory canal of a user.

The bone conduction sensor 12 may be any number of types of sensors capable of vibration measurement. For example, the bone conduction sensor 12 may include an accelerometer, such as a piezoelectric accelerometer. Tests have shown that a piezoelectric accelerometer is capable of sensing the desired vibrations. Alternatively, a quartz sensing element may be used, and other types of sensing elements capable of adaptation for sensing bone conduction vibrations. The present invention is in no way limited to a particular type of vibration sensing.

Figure 2:
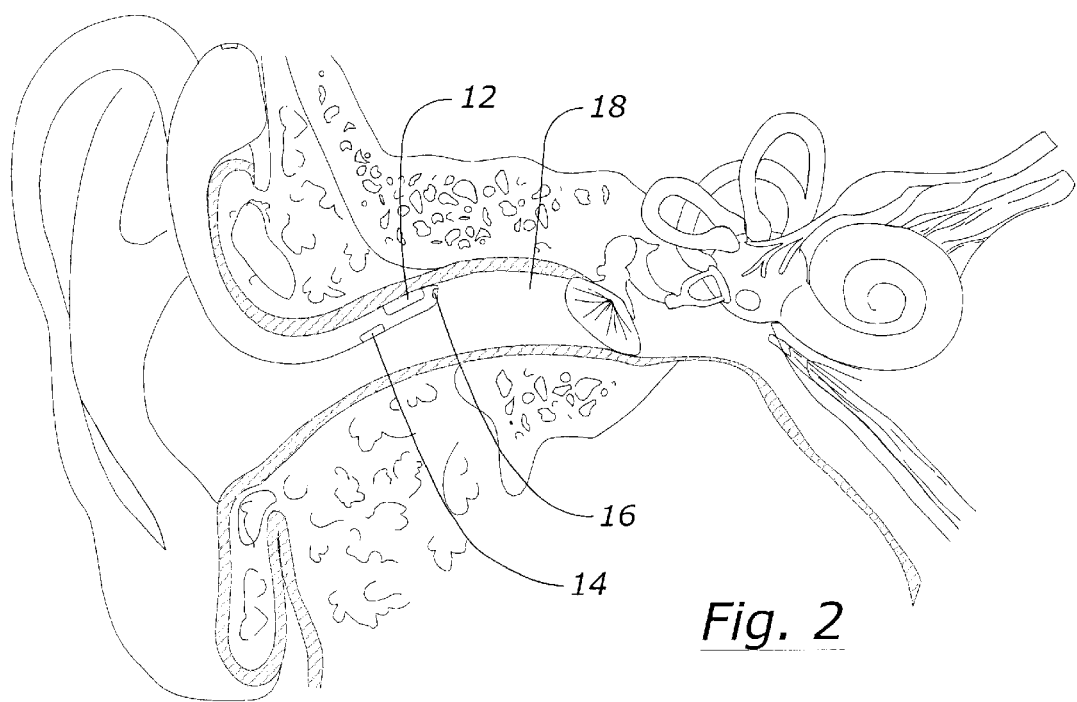
FIG. 2 is a diagrammatic representation of the voice communication device of the present invention fitted within the external auditory canal of a user.

FIG. 2 provides pictorial representation of the earpiece 10 of the present device positioned within the ear of a user. The bone conduction sensor 12 is positioned adjacent the posterior superior wall of the external auditory canal 18. Although the present invention is in no way limited to this particular placement of the bone sensor, this placement of the bone conduction sensor 12 provides for improved sensing of vibrations associated with the mastoid bone.

Figure 3A:
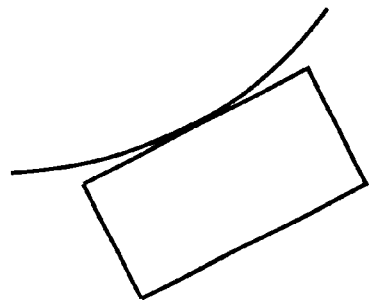
FIG. 3A is a diagram of a prior art bone conduction sensor.
Figure 3B:
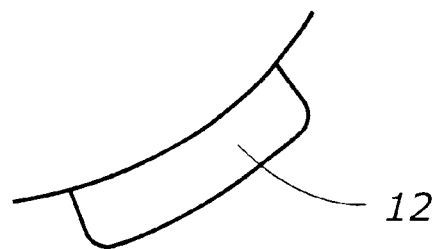
FIG. 3B is diagram of the bone conduction sensor of the present invention fitted against a wall of the external auditory canal.

The present invention provides for the bone conduction sensor of the earpiece 10 to have an improved shape. FIG. 3A shows the shape of a prior art bone conduction sensor. FIG. 3B shows an improved bone conduction sensor. The improved bone conduction sensor is shaped to more closely fit or contour a wall of the external auditory canal, such as the posterior superior wall. The fit of the bone conduction sensor 12 increases the amount of surface area contact between a sensing element within the bone conduction sensor and the wall of the external auditory canal. This increased surface area results in improved operation of the sensor as the quality of the transmitted vibrations that are received is improved. In addition, the width of the bone conduction sensor protruding into the external auditory canal is reduced permitting an earpiece to be smaller in size and more nonocclusive. This results in a number of advantages including improved quality of the air conduction signal, improved quality of output from a speaker disposed within the external auditory canal, increased comfort for a user, and reduced likelihood of displacement of the bone conduction sensor.

Figure 3C:
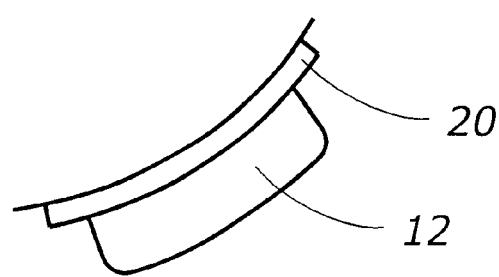
FIG. 3C is a diagrammatic representation of the bone conduction sensor of the present invention including the separation layer.

FIG. 3C discloses the bone conduction sensor 12 of the present invention with a separation layer 20. The separation layer 20 may be a film or screen or other barrier. The separation layer is silicone, rubber or plastic or other material that permits transmission of vibrations. The separation layer is attached to the bone conduction sensor and is adapted to be fitted directly to the wall of the external auditory canal. The separation layer is capable of conveying vibrations at the wall to the bone conduction sensor. The separation layer 20 provides advantages of improved vibrations received at the bone conduction sensor while still maintaining separation. The separation layer allows the effective surface area for bone vibration pickup to be increased when the separation layer extends beyond the bone conduction sensor itself. The separation layer is preferably an electrically insulating material. This provides several advantages. One advantage is in the bone sensing. The body of a user can give off electrical impulses that can affect the operation of the bone conduction sensor. Although signal spikes and other effects of these electrical impulses can be compensated for in signal processing, the separation layer also serves to eliminate the effect of these electrical impulses. This separation layer can also protect the user from the effects of an electrical impulse generated by the bone conduction sensor. This separation layer also can result in a more comfortable fit for a user and can make a contoured bone conduction sensor more easily custom fit to a user's external auditory canal while still maintaining a snug fit between the bone conduction sensor and the external auditory canal of a user for improved sensor pickup.

Figure 4A:
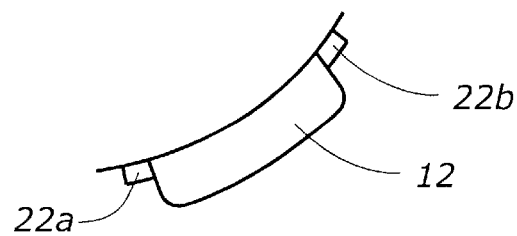
FIG. 4A is a diagram of the present invention where two contact sensors are in contact with the external auditory canal of the user.
Figure 4B:
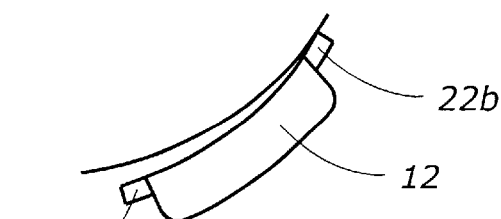
FIG. 4B is a diagram of the present invention where the first of two contact sensors is in contact with the external auditory canal of a user.
Figure 4C:
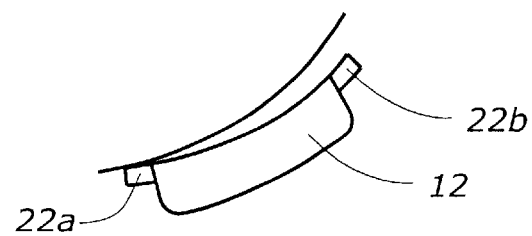
FIG. 4C is a diagram where the second of two contact sensors is in contact with the external auditory canal of the user.

FIGS. 4A through 4C illustrate a contact sensor of the present invention. It is advantageous to be able to detect when the bone conduction sensor becomes dislodged or displaced, particularly in the context of the earpiece of the present invention. To monitor the placement or displacement of the bone conduction sensor 12, one or more contact sensors may be used. The present invention contemplates that the contact sensors may be contact switches, proximity sensors, pressure sensors, or other sensors capable of determining whether all or a portion of the bone conduction sensor 12 is in contact with a wall of the external auditory canal or to what extent the bone conduction sensor 12 is in contact with the wall of the external auditory canal. As shown, the bone conduction sensor 12 is associated with a contact sensor 22A and a contact sensor 22B. The contact sensors 22A and 22B contact an external wall of the auditory canal. In FIG. 4B, the bone conduction sensor with contact sensors is shown where contact sensor 22A is not in contact with the wall of the external auditory canal whereas sensor 22B is in contact with the wall of the external auditory canal. Conversely, in FIG. 4C, contact sensor 22A is in contact with the wall of the external auditory canal while contact sensor 22B is not in contact with the wall of the external auditory canal. By monitoring the contact sensors 22A and 22B, it is determined whether or not the bone conduction sensor 12 has become displaced or dislodged. When one or more of the contact sensors are not in contact with the external wall of the auditory canal, then it is known that displacement has occurred. The present invention provides for compensation for displacement by altering the sound processing algorithm used by a processor in a voice sound transmission device. For example, where both an air conduction sensor and a bone conduction sensor are used, the signal received from the air conduction sensor may be more heavily relied upon including solely relied upon once it is known that the bone conduction sensor is displaced and may not be providing the desired signal. For example, if neither contact sensor 22A nor 22B is in contact with the external auditory canal, then the air conduction sensor can be relied upon exclusively. Alternatively, when one of the two contact sensors indicate there is contact, but the other contact sensor indicates that there is not, then the bone conduction sensor may be partially relied upon. When both contact sensors are indicating contact, then the bone conduction sensor may be considered to be functioning properly and normal processing can occur. The amount of force or pressure required to indicate that the bone conduction sensor is in contact with the external auditory canal may be dependent upon the size, shape, and weight of the bone conduction sensor. However, it has been found that the current bone conduction sensor requires only about 0.2 grams of contact weighting when in full contact with an external auditory canal wall for optimal function.

Figure 4D:
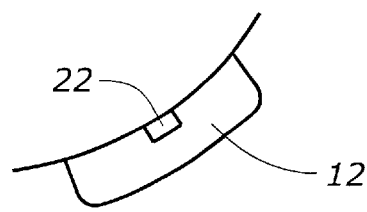
FIG. 4D is a diagram where a single contact sensor is used to determine whether the bone conduction sensor is in contact with the external auditory canal of a user.

The present invention also provides for a single contact sensor to be used as shown in FIG. 4D. In FIG. 4D, the contact sensor 22 is located at a central point with respect to the bone conduction 12, however, the present invention contemplates that the contact sensor 22 may be located at other points, including at either end of the bone conduction sensor 12.

Figure 5A:
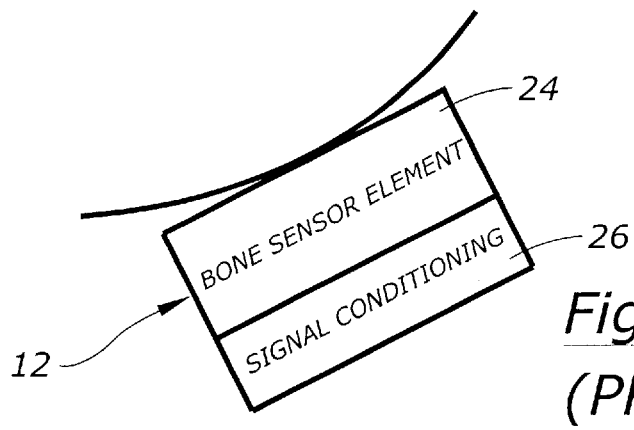
FIG. 5A is a diagram of a prior art bone conduction sensor where both the sensor element and the signal conditioning are located within the external auditory canal of the user.
Figure 5B:
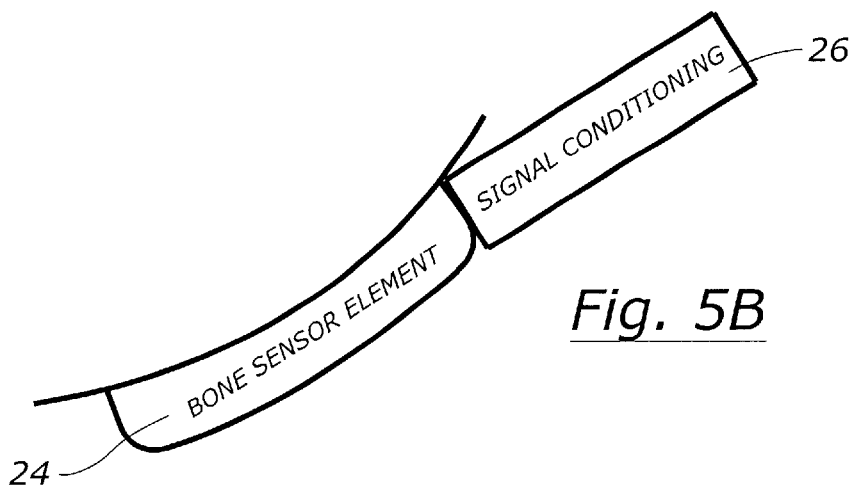
FIG. 5B is a diagram of the present invention where the bone sensor element is located adjacent the circuit portion of the bone conduction sensor.

In FIG. 5A and 5B, additional improvement of the present invention is disclosed. The present invention contemplates separating a bone conduction sensor into a bone sensor element 24 and a circuit portion. The circuit portion may be, but it not limited to a signal conditioning portion 26. The present invention contemplates that the circuit portion may contain other circuitry, including power conditioning, or other circuitry such as may be required or desirable for proper function of the bone sensing element within the context of a particular use and/or device. As shown in FIG. 5B, the signal conditioning portion 26 may be remotely located or otherwise physically separated from the bone sensor element 24. The present invention further contemplates that the circuit portion may be located remotely in the behind the ear portion of an earpiece or other location that need not be immediately adjacent the bone conduction sensor. This provides an improvement in an earpiece of the present invention in that the size of that portion of the earpiece which extends into the external auditory canal of the user is reduced. The resulting earpiece is nonocclusive to a greater degree, improving the voice sound quality of the earpiece device.

Figure 5C:
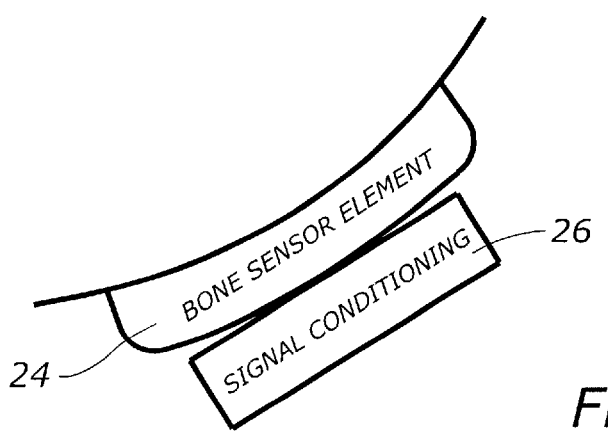
FIG. 5C is a diagram of the present invention where the bone sensor element is located adjacent the circuit portion of the bone conduction sensor in an alternative position.

FIG. 5C illustrates that the signal conditioning portion of the bone conduction sensor may be placed adjacent to the bone sensor element in a side-by-side configuration. This position is advantageous over the bone sensor of FIG. 12 in that it reduces the amount of intrusion into the external auditory canal. The present invention contemplates other placements of the signal conditioning portion of the bone conduction sensor adjacent to and remote from the bone sensor element.

Figure 6:
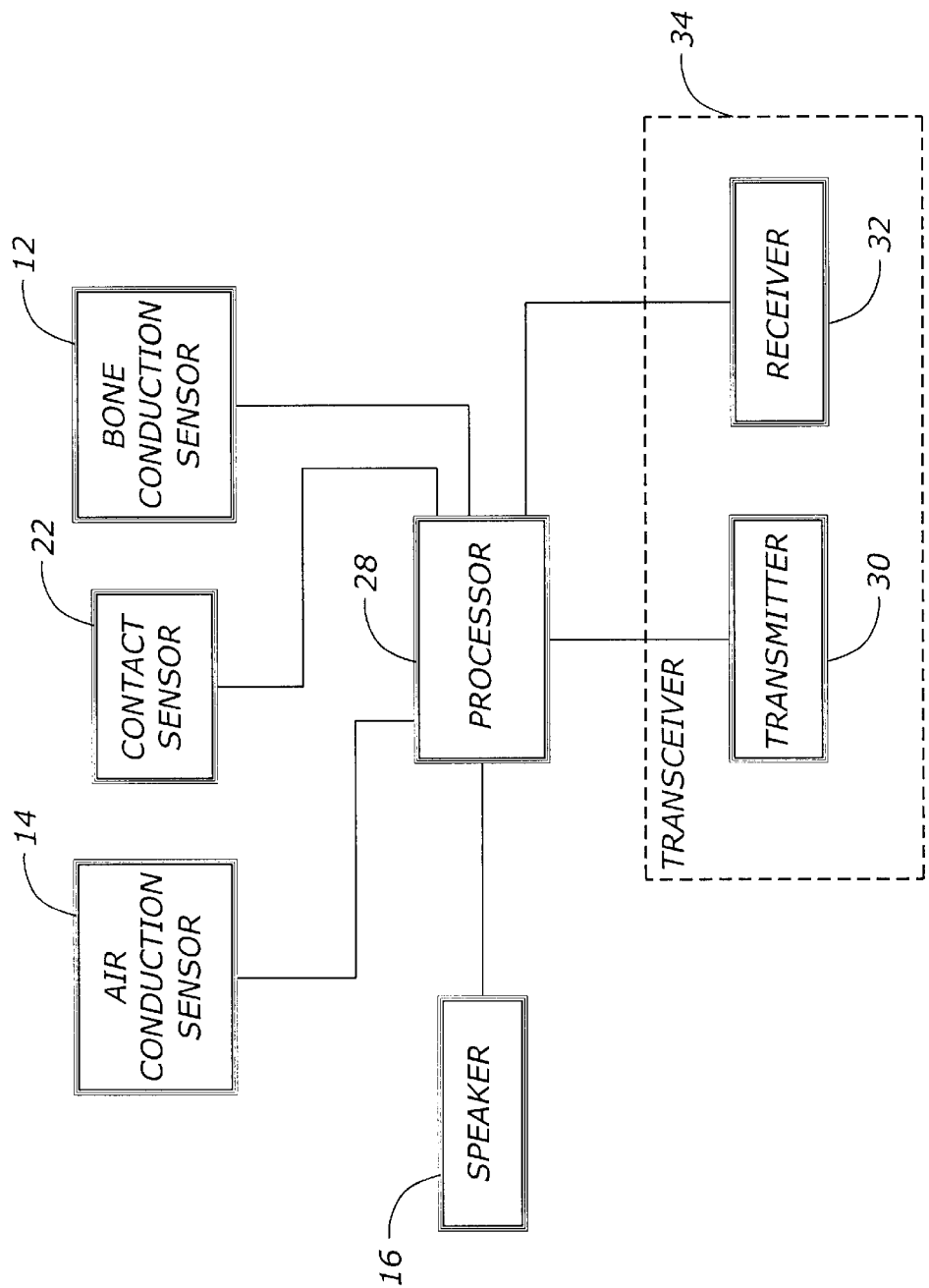
FIG. 6 is a block diagram of the present invention.

FIG. 6 is a block diagram of the present invention. In FIG. 6 both an air conduction sensor 14 and a bone conduction sensor 12 are electrically connected to a processor 28. The bone conduction sensor 12 is an improved bone conduction sensor of the present invention. A speaker 16 may also be electrically connected to the processor 28. A transmitter 30 is electrically connected to the processor 28 as is a receiver 32. The transmitter 30 and receiver 32 may be respective portions of a transceiver 34. The processor 28, transmitter 30 and receiver 32 may be located within the housing of the earpiece 10.

The processor 28 may receive both an air conduction signal from the air conduction sensor 14 and a bone conduction signal from the bone conduction sensor 12. In addition the processor can receive a signal from a contact sensor. In this manner the processor 28 can determine an algorithm to apply to the received signals. For example, if contact sensor 22 indicates that the bone conduction sensor 12 is not in proper position for bone conduction sensing of voice sound information, then the processor 28 can rely upon the signal from the air conduction sensor 14. In this manner, the processor 28 can compensate for displacement of the bone conduction sensor 12.

It should be apparent that the present invention contemplates numerous variations in the materials used for the film barrier, placement of the pressure sensors, the number of pressure sensors, the location of the signal conditioning circuitry of the bone conduction sensor, and other variations. These and other variations are within the spirit and scope of the invention now claimed.

What is claimed is:

1. A bone conduction sensor for placement in an external auditory canal comprising:

a bone sensing element having a contoured surface adapted to fit against a wall of the external auditory canal increasing the surface area contact between the sensing element and the wall of the external auditory canal;

at least one contact sensor adjacent the bone sensing element for determining contact between the bone sensing element and the external auditory canal; and a circuit portion electrically connected to the sensing element and the at least one contact sensor for determining whether the bone sensing element is in proper position and compensating for the position of the bone sensing element when not in proper position.

2. The bone conduction sensor of claim 1 wherein the circuit portion is physically adjacent the bone-sensing element.

3. The bone conduction sensor of claim 1 wherein the bone sensing element is a piezoelectric element.

4. The bone conduction sensor of claim 1 wherein the bone sensing element is adapted to fit against the posterior superior wall of the external auditory canal.

5. An earpiece for nonocclusive placement in an external auditory canal comprising:
   a housing;
   a bone conduction sensor mounted to the housing for nonocclusive placement in the auditory canal having a contoured surface adapted to fit against a wall of the external auditory canal increasing a surface area contact between the bone conduction sensor and the wall of the external auditory canal;
   an air conduction sensor adapted for nonocclusive placement in the auditory canal mounted in the housing;
   at least one contact sensor adjacent the bone conduction sensor for determining contact between the bone conduction sensor and the wall of the external auditory canal;
   a circuit portion disposed within the earpiece and electrically connected to the bone conduction sensor, the air conduction sensor, and the at least one contact sensor; and
   the circuit portion adapted for determining whether the bone conduction sensor is in proper position based on a state of the at least one contact sensor.

6. The earpiece of claim 5 wherein the at least one contact sensor includes a first contact sensor and a second contact sensor amounted adjacent the bone conduction sensor.

7. The earpiece of claim 5 further comprising a separation layer attached to the bone conduction sensor and adapted to be fitted directly to the wall of the external auditory canal and capable of conveying vibrations at the wall to the bone conduction sensor.

8. The earpiece of claim 7 wherein the separation layer comprises a material selected from the set including rubber, plastic, film, metal films silicone, and an electrical insulator.

9. The earpiece of claim 7 wherein the separation layer has a surface area adapted for contacting the wall of the external auditory canal greater in size than the surface area contact of the bone conduction sensor.

10. The earpiece of claim 5 further comprising a sound processor electrically connected to the bone conduction sensor and the air conduction sensor and disposed within the housing.

11. The earpiece of claim 5 further comprising a processor electrically connected to the bone conduction sensor and the air conduction sensor and disposed within the housing; and the at least one contact sensor electrically connected to the processor.

12. A method of bone conduction sensing comprising:
   transmitting a bone conduction vibration signal at a wall of the external auditory canal through an insulative conductive layer;
   sensing a bone conduction vibration signal at the insulative conductive layer with a sensing element;
   conveying the sensed bone conduction signal to a position removed from the external auditory canal;
   monitoring the position of the bone sensing element using at least one contact sensor;
   selectively processing the sensed bone conduction signal based on a state of the at least one contact sensor.

* * * * *